(12) United States Patent
Choi et al.

(10) Patent No.: US 10,201,950 B2
(45) Date of Patent: Feb. 12, 2019

(54) DEVICE FOR PRODUCING COMPOSITE MATERIAL, COMPOSITE MATERIAL PRODUCED USING SAME, AND METHOD FOR PRODUCING COMPOSITE MATERIAL

(71) Applicant: LG Hausys, Ltd., Seoul (KR)

(72) Inventors: Jae-Hoon Choi, Anyang-si (KR); Hee-June Kim, Seongnam-si (KR); Ae-Ri Oh, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 423 days.

(21) Appl. No.: 14/652,729

(22) PCT Filed: Oct. 7, 2013

(86) PCT No.: PCT/KR2013/008941
§ 371 (c)(1),
(2) Date: Jun. 16, 2015

(87) PCT Pub. No.: WO2014/098356
PCT Pub. Date: Jun. 26, 2014

(65) Prior Publication Data
US 2015/0314558 A1    Nov. 5, 2015

(30) Foreign Application Priority Data

Dec. 21, 2012 (KR) .......................... 10-2012-0151059

(51) Int. Cl.
*B32B 5/26* (2006.01)
*B32B 27/12* (2006.01)
(Continued)

(52) U.S. Cl.
CPC ................ *B32B 5/12* (2013.01); *B29C 65/62* (2013.01); *B29C 70/081* (2013.01);
(Continued)

(58) Field of Classification Search
CPC ....... B29B 15/105; B29B 15/12; B32B 5/022; B32B 5/06; B32B 5/12; B32B 5/26;
(Continued)

(56) References Cited

U.S. PATENT DOCUMENTS 4,622,254 A * 11/1986 Nishimura ............ B29C 70/228
428/102
4,931,358 A * 6/1990 Wahl ........................ B32B 5/06
428/340
(Continued)

FOREIGN PATENT DOCUMENTS

CN          1037939 A     12/1989
DE          2528356 A1 *  1/1976 ........... B29C 70/081
(Continued)

OTHER PUBLICATIONS

Japanese Office Action dated Jun. 27, 2017 from JPO in connection with the counterpart Japanese Patent Application No. 2015-549240, citing the above reference(s).
(Continued)

*Primary Examiner* — Michael A Tolin
(74) *Attorney, Agent, or Firm* — Hauptman Ham, LLP

(57) ABSTRACT

The present invention provides a device for producing a composite material, including: a mat production unit that produces a mat which forms a polymer film having a plurality of fiber layers; a fiber production unit that produces a wide-width fiber which is formed of a plastic resin with a single direction fiber layer; and a composite material production unit to which the mat and the double width fiber are supplied so that the mat and the wide-width fiber are laminated according to a predetermined order of lamination. Also, the present invention provides a composite material produced using the device and a method for producing said composite material.

5 Claims, 8 Drawing Sheets

(51) Int. Cl.
 B32B 37/20 (2006.01)
 B29C 65/62 (2006.01)
 B29C 70/08 (2006.01)
 B29C 70/50 (2006.01)
 D01D 11/02 (2006.01)
 B32B 5/12 (2006.01)
 B32B 38/18 (2006.01)
 B32B 37/00 (2006.01)
 B32B 5/06 (2006.01)
 B32B 27/08 (2006.01)
 B32B 27/18 (2006.01)
 B32B 5/02 (2006.01)
 B32B 37/04 (2006.01)
 B32B 38/00 (2006.01)

(52) U.S. Cl.
 CPC .......... *B29C 70/083* (2013.01); *B29C 70/086* (2013.01); *B29C 70/506* (2013.01); *B29C 70/508* (2013.01); *B32B 5/06* (2013.01); *B32B 5/26* (2013.01); *B32B 27/08* (2013.01); *B32B 27/12* (2013.01); *B32B 27/18* (2013.01); *B32B 37/00* (2013.01); *B32B 38/18* (2013.01); *D01D 11/02* (2013.01); *B32B 5/022* (2013.01); *B32B 37/04* (2013.01); *B32B 37/203* (2013.01); *B32B 2038/008* (2013.01); *B32B 2260/021* (2013.01); *B32B 2260/023* (2013.01); *B32B 2260/046* (2013.01); *B32B 2262/00* (2013.01); *B32B 2305/10* (2013.01); *B32B 2305/28* (2013.01); *B32B 2305/34* (2013.01); *B32B 2307/50* (2013.01); *B32B 2307/536* (2013.01); *B32B 2307/54* (2013.01); *B32B 2307/718* (2013.01); *B32B 2419/00* (2013.01); *B32B 2605/00* (2013.01); *Y10T 428/24124* (2015.01)

(58) Field of Classification Search
 CPC . B32B 27/12; B32B 37/203; B32B 2038/008; B32B 2260/021; B32B 2260/023; B32B 2260/046; B32B 2305/076; B32B 2305/10; B32B 2305/22; B32B 2305/28; B29C 65/62; B29C 70/081; B29C 70/083; B29C 70/086; B29C 70/12; B29C 70/20; B29C 70/506; B29C 70/508; B29K 2105/0872; B29K 2105/0881; B29K 2105/128; B65H 16/02; B65H 16/021; B65H 16/023; B65H 19/12; B65H 2301/4135; B65H 2301/41352; B65H 2301/4139; B65H 2301/41394; B65H 2301/4193; C08J 5/24; D01D 11/02
 See application file for complete search history.

(56) References Cited

U.S. PATENT DOCUMENTS

| | | | | |
|---|---|---|---|---|
| 5,716,697 | A | * | 2/1998 | Meeker ................ B29C 70/086 428/297.4 |
| 6,743,392 | B2 | * | 6/2004 | Tanaka ................ B29B 15/122 264/136 |
| 6,838,148 | B1 | * | 1/2005 | Ehnert .................. B29C 43/34 428/109 |
| 2001/0000162 | A1 | | 4/2001 | Fletemier et al. |
| 2006/0141884 | A1 | | 6/2006 | Haque |
| 2011/0076441 | A1 | * | 3/2011 | Gruenert ................ B29B 15/12 428/113 |
| 2013/0213571 | A1 | * | 8/2013 | Gloeckner ............. B29C 65/52 156/324 |

FOREIGN PATENT DOCUMENTS

| | | | | |
|---|---|---|---|---|
| GB | 2040801 | A | * 9/1980 | ............ B29B 15/12 |
| JP | S64-81826 | A | 3/1989 | |
| JP | H02-134232 | A | 5/1990 | |
| JP | H05-16138 | A | 1/1993 | |
| JP | H05-31811 | A | 2/1993 | |
| JP | H06-272148 | A | 9/1994 | |
| JP | 2004-35715 | A | 2/2004 | |
| JP | 2004-60131 | A | 2/2004 | |
| JP | 2004035714 | A | 2/2004 | |
| JP | 2008-132705 | A | 6/2008 | |
| JP | 2008-525663 | A | 7/2008 | |
| JP | 2011073436 | A | 4/2011 | |
| KR | 10-0296229 | B1 | 5/2001 | |
| KR | 1020010079853 | A | 8/2001 | |
| KR | 20020086784 | A | 11/2002 | |
| KR | 1020050018497 | A | 2/2005 | |
| KR | 20100120888 | A | 11/2010 | |
| KR | 1020120067202 | A | 6/2012 | |
| KR | 101198256 | B1 | 11/2012 | |
| TW | 254884 | B | 8/1995 | |

OTHER PUBLICATIONS

Korean Notice of Allowance dated Mar. 22, 2016 corresponding to Korean Application No. 10-2012-0151059 citing the above reference(s).

International Search Report for PCT/KR2013/008941 dated Dec. 24, 2013, citing the above reference(s).

Taiwanese Office Action dated Nov. 20, 2017 in connection with the counterpart Taiwanese Patent Application No. 102146975, citing the above reference(s).

* cited by examiner

DEVICE FOR PRODUCING COMPOSITE MATERIAL, COMPOSITE MATERIAL PRODUCED USING SAME, AND METHOD FOR PRODUCING COMPOSITE MATERIAL

CROSS-REFERENCE TO RELATED APPLICATION

The application claims the priority of Korea Patent Application No. 10-2012-0151059 filed on Dec. 21, 2012 in the KIPO (Korean Intellectual Property Office). Further, this application is the National Phase application of International Application No. PCT/KR2013/008941 filed on Oct. 7, 2013, which designates the United States and was published in Japanese.

TECHNICAL FIELD

The present invention relates to a device for manufacturing a composite material, and more particularly, to a device for manufacturing a composite material capable of manufacturing a composite material using a polymer/fiber mat and wide-width unidirectional fibers, a composite material manufactured using the device, and a method for manufacturing the composite material.

BACKGROUND ART

Generally, high-strength lightweight materials which exhibit a high degree of resistance to external force and have a light weight are required in industries such as automobiles and construction materials.

A typical technique for manufacturing a composite material is used to develop a material having a light weight while exhibiting similar strength to metal by mixing and impregnation of a plastic resin with fibers.

Typically, composite materials can exhibit strength and hardness varying with lengths of fibers and mixing methods.

Materials having excellent moldability while exhibiting a certain level or higher of properties are required depending on purposes of composite materials.

However, since a typical mat uses a nonwoven fabric-form polymer and a single type of fiber, a manufacturing device is simple, there is a difficulty in application of the device, and a composite material exhibiting excellent moldability and properties cannot be produced.

DISCLOSURE

Technical Problem

It is an aspect of the present invention to provide a device for manufacturing a composite material satisfying moldability and properties by realizing various forms of stacking of a polymer/fiber mat and wide-width unidirectional fibers, a composite material manufactured using the device, and a method for manufacturing the composite material.

Technical Solution

In accordance with one aspect of the present invention, there is provided a device for manufacturing a composite material, which includes: a mat manufacturing unit manufacturing a mat in which a polymer film having a plurality of fiber layers is formed; a fiber manufacturing unit manufacturing wide-width fiber having a unidirectional fiber layer and being formed with a plastic resin; and a composite material manufacturing unit receiving the mat and the wide-width fiber and stacking the mat and the wide-width fiber in a preset stacking order.

The fiber manufacturing unit may include: a plurality of plastic resin feeders supplying a plastic resin; a unidirectional fiber feeder supplying unidirectional fibers between layers of the supplied plastic resin; and a securing unit forming the wide-width fiber through fastening the unidirectional fibers and the plastic resin by applying certain heat and pressure to the plastic resin to which the unidirectional fibers are supplied.

The unidirectional fiber feeder may include: a unidirectional fiber feeding roller around which the unidirectional fiber is wound; a plurality of guide rollers disposed at crossing positions so as to guide the unidirectional fibers unwound from the unidirectional fiber feeding roller to the securing unit; and a plurality of elevators receiving power supplied from an outside and adjusting a width of the unidirectional fibers by moving the plural guide rollers up and down.

The unidirectional fiber feeder may further include an air feeder.

The air feeder may supply air of a certain pressure to the unidirectional fibers during movement of the unidirectional fibers.

The composite material manufacturing unit includes: a composite material feeder supplying the mat and the wide-width fiber at different positions; a composite material securing unit forming a composite material through fastening the mat and the wide-width fiber by applying certain heat and pressure to the mat and the wide-width fiber; a cooler cooling the composite material to a certain temperature; and a winder winding the cooled composite material.

A stacking order of the mat and the wide-width fiber may be determined depending on the different positions at which the mat and the wide-width fiber are supplied.

The composite material feeder may include: a plurality of mat feeding rollers around which the mat is wound in a certain amount; a plurality of wide-width fiber feeding rollers around which the wide-width fiber is wound in a certain amount; and a position mover receiving the stacking order from an outside and changing positions of the plural mat feeding rollers and the plural wide-width fiber feeding rollers so as to form the received stacking order.

The position mover may include: a first guide member guiding movement of the plural mat feeding rollers; a second guide member guiding movement of the plural wide-width fiber feeding rollers; a first motor moving each of the mat feeding rollers; a second motor moving each of the wide-width fiber feeding rollers; and a controller receiving the stacking order input from an outside and allowing each of the mat feeding rollers and each of the wide-width fiber feeding rollers to be moved to preset positions in the stacking order by driving the first and second motors.

The mat manufacturing unit includes: a transfer unit forming a transfer path; a film feeder supplying a plurality of films to the transfer path such that different layers are formed; a fiber feeder supplying fibers between layers of the films; and a sewing unit sewing the films transferred along the transfer path and including the fibers supplied thereto.

The film feeder may include: a plurality of film feeding rollers each including the film wound therearound and disposed at regular intervals along the transfer path at an upper side of the transfer path; and a first rotator rotating the plural film feeding rollers such that each of the films is unwound.

The fiber feeder may include: a plurality of fiber feeding rollers supplying the fibers; a second rotator rotating the fiber feeding rollers such that the fibers are unwound; and a plurality of cutters disposed between the film feeding rollers and cutting each of the unwound fibers to a certain length.

In accordance with another aspect of the present invention, there is provided a composite material manufactured using the device for manufacturing a composite material as set forth above.

In accordance with a further aspect of the present invention, there is provided a method for manufacturing a composite material, which includes: a first step of preparing a mat in which a polymer film having a plurality of fiber layers is formed; a second step of forming a unidirectional fiber layer by adjusting a supply width to form the unidirectional fiber layer and to manufacture a wide-width fiber formed of a plastic resin with the unidirectional fiber layer; and a third step of receiving the mat and the wide-width fiber and stacking the mat and the wide-width fiber in a preset stacking order.

In the second step, the wide-width fiber may be formed by supplying the plastic resin, supplying unidirectional fiber layer between layers of the supplied plastic resin while adjusting the supply width, and securing the unidirectional fibers such that the unidirectional fibers are wrapped with the plastic resin by sequentially applying certain heat and pressure to the plastic resin which the unidirectional fiber is supplied thereto and cooling the plastic resin.

In the third step, stacking may be performed such that the wide-width fiber is formed in multiple layers and the wide-width fiber formed in multiple layers are wrapped with the mat, or such that the mat and the wide-width fiber are alternately stacked.

Advantageous Effects

According to the present invention, the composite material can exhibit satisfactory moldability and properties by realizing various forms of stacking of the polymer/fiber mat and the wide-width unidirectional fibers.

BEST MODE

Hereinafter, a device for manufacturing a composite material, a composite material manufactured using the device and a method for manufacturing the composite material according to embodiments of the present invention will be described in detail with reference to the accompanying drawings.

First, a device for manufacturing a composite material according to one embodiment of the present invention will be described in detail.

Figure 1:
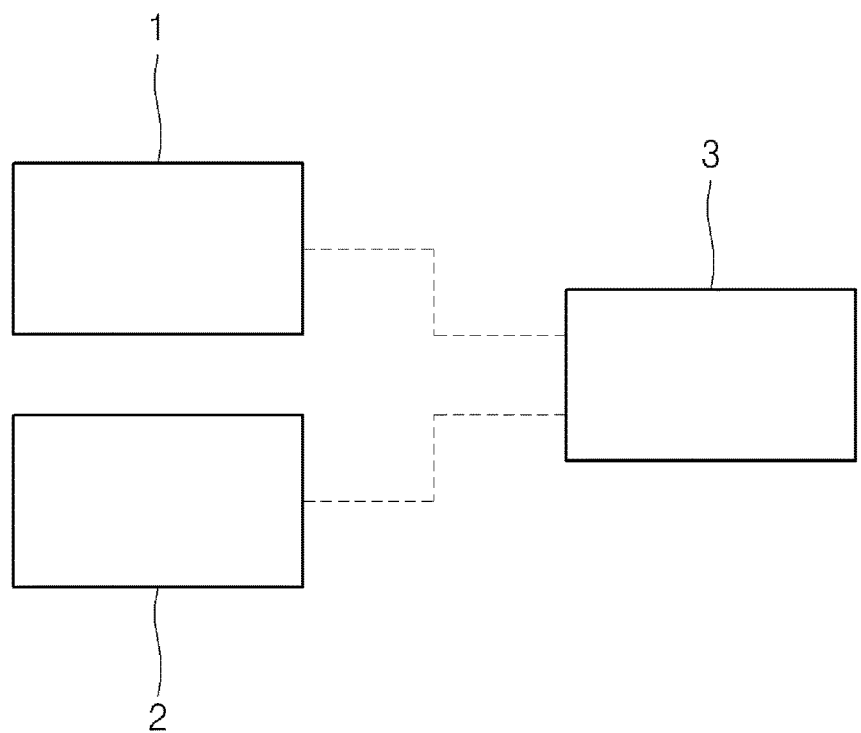
FIG. 1 is a diagram of a device for manufacturing a composite material according to one embodiment of the present invention.

FIG. 1 is a diagram of a device for manufacturing a composite material according to one embodiment of the present invention.

Referring to FIG. 1, the device for manufacturing a composite material according to the present invention includes a mat manufacturing unit 1, a fiber manufacturing unit 2, and a composite material manufacturing unit 3.

Figure 2:
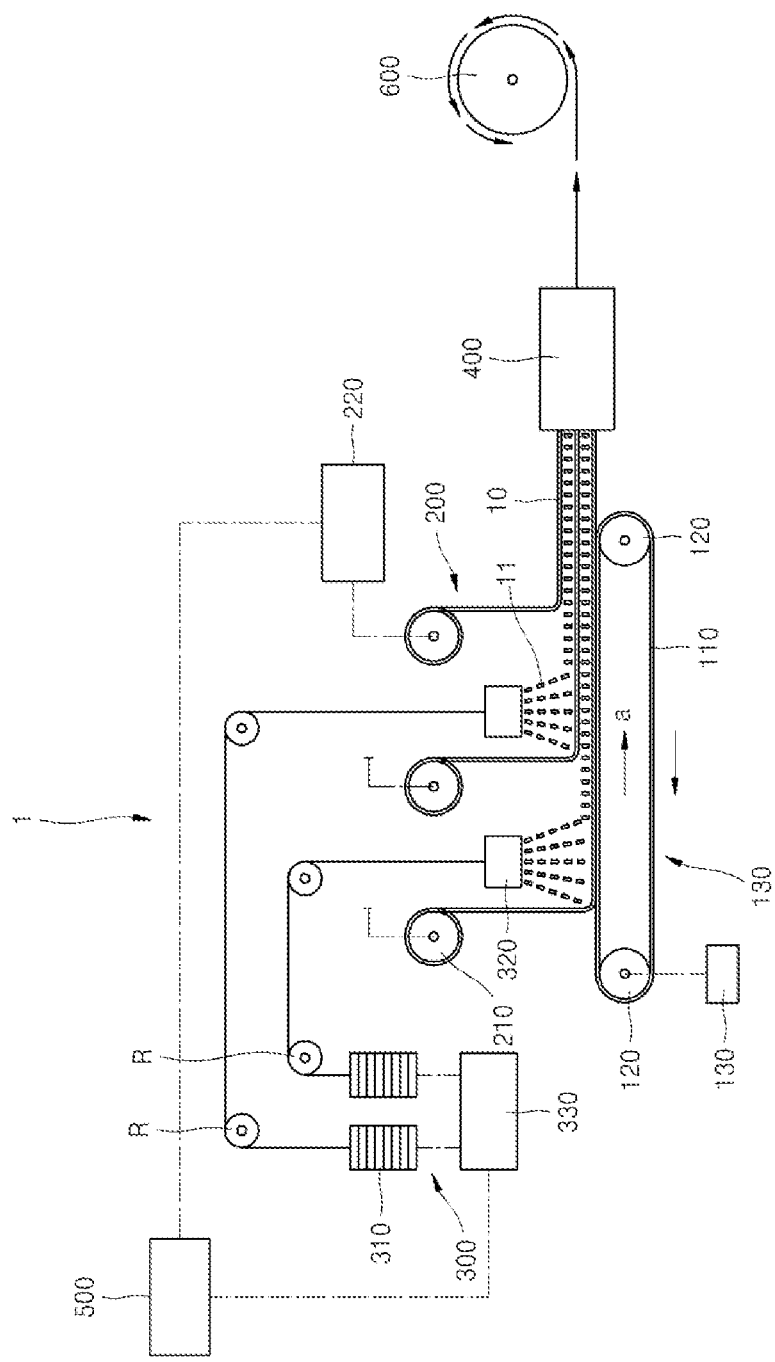
FIG. 2 is a diagram of a mat manufacturing unit according to one embodiment of the present invention.

FIG. 2 is a diagram of a mat manufacturing unit according to one embodiment of the present invention.

Referring to FIG. 2, the mat manufacturing unit 1 includes a transfer unit 100, a film feeder 200, a fiber feeder 300, a sewing unit 400, a controller 500, and a mat winding roller 600.

The transfer unit 100 includes a conveyer belt 110, drive rollers 120, and a belt rotator 130.

The drive rollers 120 are provided as one pair and support both ends of the conveyer belt 110 while being rotated.

The belt rotator 130 is a device such as a motor, and rotates the drive rollers 120 at a preset rotational speed. The belt rotator 130 is rotated in response to a control signal sent from the controller 500.

Therefore, the conveyer belt 110 is rotated in association with rotation of the drive rollers 120, and forms a transfer path (a) following the arrow direction.

The film feeder 200 is disposed at an upper side of the transfer unit 100. The film feeder 200 includes three film feeding rollers 210 and a first rotator 220 rotating each of the film feeding rollers 210.

The film feeding rollers 210 are disposed at regular intervals in a horizontal direction, that is, in a direction of the transfer path (a).

Here, the number of film feeding rollers 210 is not limited to three, and more or less than three film feeding rollers may be provided.

The number of film feeding rollers 210 may be determined depending on the number of layers of a film 10 of a manufactured mat.

The film 10 of a certain length is wound around each of the film feeding rollers 210. The film 10 may be a polymer film.

The first rotator 220 rotates the film feeding rollers 210 such that the film 10 can be unwound from each of the film feeding rollers 210, and the unwound film droops in a gravity direction and arrives on the conveyer belt 110.

In addition, the fiber feeder 300 cuts a predetermined fiber to a certain size and supplies the fiber to an upper surface of each of the films 10 between the film feeding rollers 210.

The fiber feeder 300 includes a plurality of fiber feeding rollers 310, cutters 320, and a second rotator 330.

The number of fiber feeding rollers 310 may be one less than the number of film feeding rollers 210.

In addition, the cutters 320 are also provided in a corresponding number to the number of the fiber feeding rollers 310.

Therefore, two fiber feeding rollers 310 may be rotated by the second rotator 330 such that long fibers can be wound around the fiber feeding rollers.

Further, two cutters 320 are disposed between the film feeding rollers 210, and cut a fiber 11, which is unwound from each of the fiber feeding rollers 310 and moved, to a certain length.

Therefore, the fiber 11 cut as described above is dropped from each of the cutters 320 onto an upper surface of the film 10 placed at a lower side of the cutters.

Each of the cutters 320 may include a pair of cutting plates 321 in which cutting blades 32a are engaged with each other and rotated.

Figure 3:
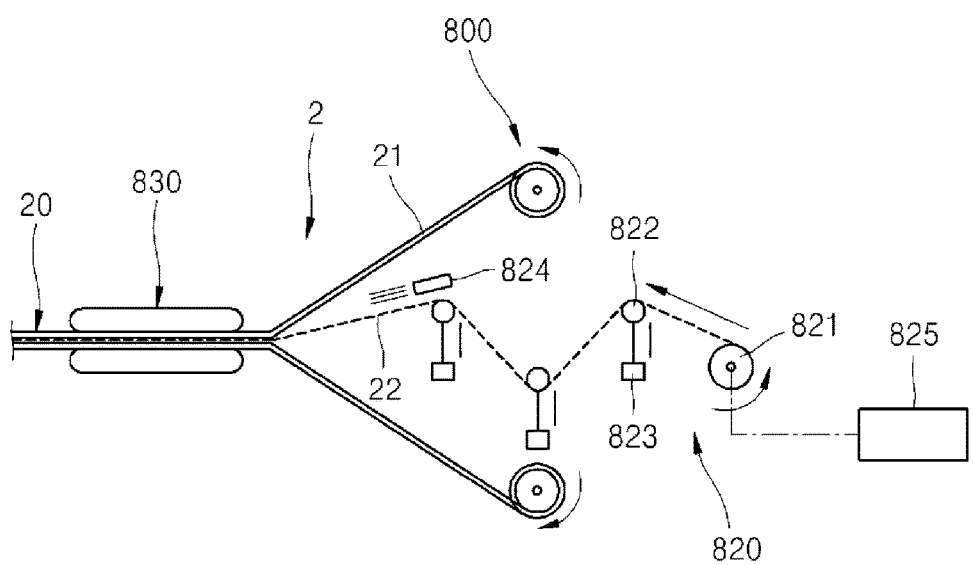
FIG. 3 is a diagram of a fiber manufacturing unit according to one embodiment of the present invention.

FIG. 3 is a diagram of a fiber manufacturing unit according to one embodiment of the present invention.

Referring to FIG. 3, the fiber manufacturing unit 2 is a device for manufacturing wide-width fiber 20 formed of a plastic resin 21 with a layer of unidirectional fibers 22.

The fiber manufacturing unit 2 includes a plurality of plastic resin feeders 810, a unidirectional fiber feeder 820, and a securing unit 830.

Each of the plastic resin feeders 810 includes a plastic resin feeding roller.

A certain amount of the plastic resin 21 is wound around the plastic resin feeding roller.

According to the present invention, the plastic resin feeding rollers are provided as one pair, and disposed at a certain interval in a vertical direction.

In addition, a pair of plastic resin feeding rollers may be simultaneously rotated by a separate motor.

The unidirectional fiber feeder 820 includes a unidirectional fiber feeding roller 821, a plurality of guide rollers 822, and a plurality of elevators 823.

A certain amount of the unidirectional fibers 22 are wound around the unidirectional fiber feeding roller.

The unidirectional fiber feeding roller 821 is disposed between the pair of plastic resin feeding rollers.

The unidirectional fiber feeding roller 821 is driven by a motor.

In addition, the plural guide rollers 822 are rotatably disposed at positions of different levels so as to allow the unidirectional fibers 22 to be introduced into the securing unit 830.

Further, the plural elevators 823 may adjust a width of the unidirectional fibers 22 through adjustment of an elevation or level of each of the guide rollers 822.

The unidirectional fibers 22 are controlled to be thinly spread by adjustment of a gap thereof between the plastic resins 21 through adjustment of tension by adjusting the elevators 823 as described above.

Furthermore, the unidirectional fiber feeder 820 may further include an air feeder 824.

The air feeder 824 receives power from the outside and supplies air of a certain pressure onto an outer surface of the fiber 22 guided by the plural guide rollers 822. This may also be used as one of methods for adjusting a width of the fiber 22.

In addition, the securing unit 830 provides heat at a certain temperature and pressure to secure the plastic resins 21 supplied from the pair of plastic resin feeding rollers and the unidirectional fibers 22 supplied between the plastic resins.

Therefore, the securing unit 830 can manufacture the wide-width fiber 20.

Figure 4:
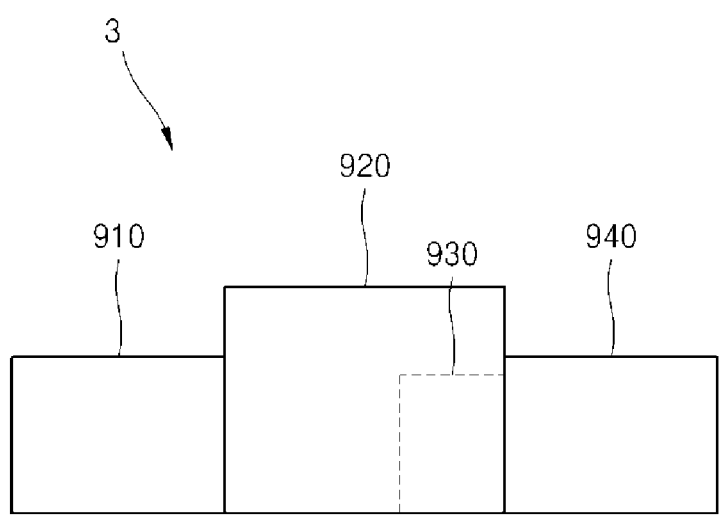
FIG. 4 is a diagram of a composite material manufacturing unit according to one embodiment of the present invention.
Figure 5:
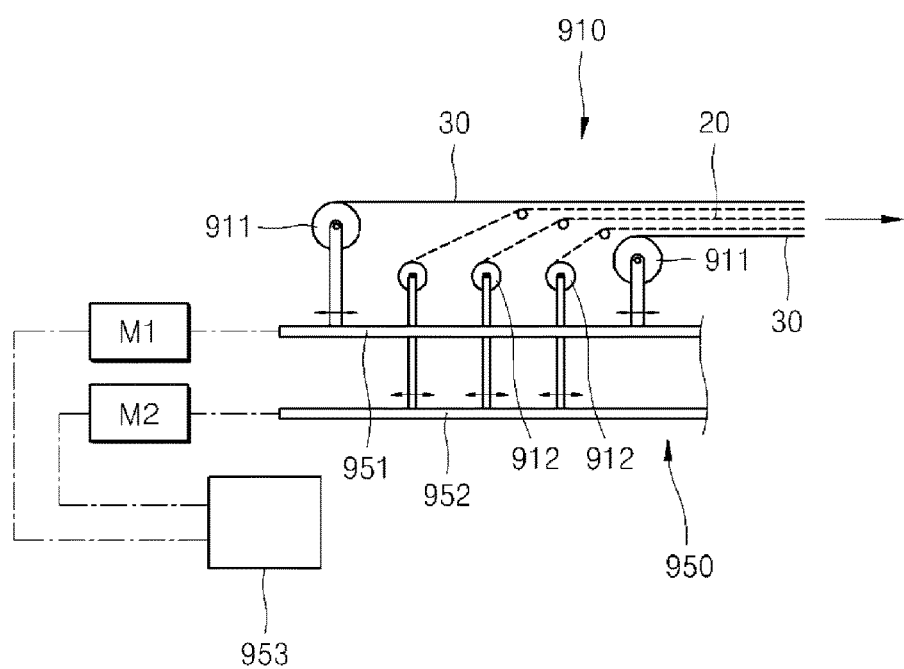
FIG. 5 is a diagram of one example of supply of a mat and wide-width fiber performed by a composite material feeder according to the embodiment of the present invention.

FIG. 4 is a diagram of a composite material manufacturing unit according to one embodiment of the present invention, and FIG. 5 is a diagram of one example of supply of a mat and wide-width fiber performed by the composite material feeder according to the embodiment of the present invention.

Referring to FIG. 4, the composite material manufacturing unit 3 according to the present invention includes a composite material feeder 910, a composite material securing unit 920, a cooler 930, and a winder 940.

The composite material feeder 910 supplies a mat 30 manufactured by the mat manufacturing unit 1 and the wide-width fiber 20 at different positions.

The composite material feeder 910 includes a plurality of mat feeding rollers 911 around which the mat 30 is wound in a certain amount; a plurality of wide-width fiber feeding rollers 912 around which the wide-width fiber 20 is wound in a certain amount; and a position mover 950 receiving a stacking order from an outside and changing positions of the plural mat feeding rollers 911 and the plural wide-width fiber feeding rollers 912 so as to form the received stacking order.

The position mover 950 includes: a first guide member 951 guiding movement of the plural mat feeding rollers 911; a second guide member 952 guiding movement of the plural wide-width fiber feeding rollers 912; a first motor M1 moving each of the mat feeding rollers 911; a second motor M2 moving each of the wide-width fiber feeding rollers 912; and a controller 500 receiving the stacking order input from the outside and allowing each of the mat feeding rollers 911 and each of the wide-width fiber feeding rollers 912 to be moved to preset positions based on the stacking order by driving the first and second motors M1, M2.

Here, the first and second motors M1, M2 may be linear motors.

The composite material securing unit 920 serves to secure the mat 30 and the wide-width fiber 20, which are stacked in a certain stacking order, to each other by applying heat at a certain temperature and pressure thereto.

In addition, the cooler 930 cools a composite material, which is secured as described above, to a certain temperature. The cooler 930 may perform cooling by air cooling.

The composite material cooled as described above may be wound around the winder 940 and collected.

MODE FOR INVENTION

Next, according to one embodiment of the present invention, a method for manufacturing a composite material using the device for manufacturing a composite material having constitution as set forth above will be described in detail.

A first step of preparing a mat in which a polymer film having a plurality of fiber layers is formed is performed.

Referring to FIGS. 1 and 2, the number of layers of films 10 is input to the controller 500 via the input unit. According to the present invention, by way of example, the number of layers of the films is set to 3.

Next, the controller 500 selects fiber feeding rollers 310 to be driven. The number of fiber feeding rollers 310 is set to 2, which is one less than 3.

Here, the fiber feeding rollers 310 may be rollers supplying fibers 11 between three film feeding rollers 210.

In addition, according to the present invention, a cutting length of the fibers 11 may be input to the controller 500 via the input unit.

The controller 500 may rotate a third rotator 322 at a rotational speed allowing the fibers 11 to be cut in a desired cutting length.

Under the conditions as described above, the controller 500 drives the transfer unit 100, the fiber feeder 300, the film feeder 200, and the sewing unit 400.

In the film feeder 200, each of the film feeding rollers 210 is rotated to unwind the polymer film 10 while being rotated by the first rotator 220.

The wound films 10 are dropped downwards and arrive on the conveyer belt 110 of the transfer unit 100. Positions at which the films 10 arrive form a certain interval due to different positions at which the film feeding rollers 210 are disposed.

Therefore, an empty space is formed between the films 10.

Simultaneously, each of the fiber feeding rollers 310 allows the fibers 11 such as a long fiber to be unwound while being rotated by the second rotator 330.

The unwound fibers 11 are moved along a guide roller R and moved to each of the cutters 320.

In each of the cutters 320, a pair of cutting plates 321 is rotated at the rotational speed as set forth above.

Therefore, the moved fibers 11 are cut to a certain length, dropped downward, and arrive on an empty region between the films 10.

At the same time, as the conveyer belt 110 is moved, a total of three layers of the films 10 are formed and the cut fibers 11 are interposed between the layers of the films 10.

Therefore, a mat in which two fiber layers and three film layers are formed is transferred to the sewing unit 400 by the conveyer belt 110.

The sewing unit 400 sews the mat based on the number of times of sewing and a sewing interval, which correspond to the input cutting length as set forth above.

That is, according to the present invention, the number of times of sewing and the sewing interval may be set in proportion to the cutting length, thereby variably adjusting sewing efficiency based on the cutting length.

As described above, according to the present invention, the mat exhibiting good moldability and desired properties can be easily manufactured, and the number of film layers and the number of fiber layers can be selectively adjusted in the manufacturing process, thereby enabling easy manufacture of various mats.

In addition, according to the present invention, operation of the sewing unit is controlled in proportion to the cutting length of the fibers, thereby efficiently controlling needle density while separately applying a process of sewing the mat, that is, a needling process.

Therefore, the mat manufacturing unit according to the present invention manufactures a mat having a fiber layer composed of the cut fibers inside the film.

Next, a second step of forming a unidirectional fiber layer through adjustment of a supply width and manufacturing wide-width fiber having the unidirectional fiber layer and formed of a plastic resin is performed.

Referring to FIG. 3, the plastic resin feeder 810 supplies a plastic resin 21 to the securing unit 830. According to the present invention, the plastic resin 21 is supplied to form two layers.

In addition, the unidirectional fiber feeder 820 supplies unidirectional fibers 22 between the two layers of the plastic resin 21.

Here, the unidirectional fibers 22 are guided to be interposed between the two layers by a plurality of guide rollers 822.

Further, the controller 500 may control an elevation of each of the guide rollers 822 using each of the elevators 823, and may supply air of a certain pressure to the unidirectional fibers using the air feeder 824.

Thus, the width of the moved unidirectional fibers 22 may be adjusted.

In particular, tension of the unidirectional fibers 22 may be adjusted by adjusting the elevation of each of the guide rollers 822, whereby the unidirectional fibers 22 can be supplied while being thinly spread between the plastic resins 21 and generating a gap therebetween.

In addition, as described above, the two layers of the plastic resin 21 including the unidirectional fibers 22 interposed therebetween are exposed to heat at a certain temperature and pressure while passing through the securing unit 830.

Here, since the unidirectional fibers 22 are thinly spread between the plastic resins 21 while generating a gap therebetween, the plastic resin 21 may wrap the unidirectional fibers 22 while being melted.

Further, the unidirectional fibers may be secured in place through cooling while being wrapped with the plastic resin 21.

Therefore, the unidirectional fibers 22 are stably secured, thereby improving strength of wide-width fiber 20.

Therefore, the wide-width fiber 20 can be manufactured through the securing unit 830.

According to the present invention, the mat 30 is manufactured in the mat manufacturing unit 1, and the wide-width fiber 20 are manufactured in the fiber manufacturing unit 2.

Next, a third step of receiving the mat and the wide-width fiber and stacking the mat and the wide-width fiber in a preset stacking order is performed.

As such, the mat 30 and the wide-width fiber are transferred to the composite material feeder 910 shown in FIG. 4 through guidance of a moving roller not shown in the figures.

According to the present invention, composite material manufacturing unit 3 can manufacture a composite material using the mat 30 and the wide-width fiber 20 while adjusting a stacking order thereof.

Here, the mat feeding rollers 911 and the wide-width fiber feeding rollers 912 are disposed as shown in FIG. 5, and in this state, when the mat 30 and the wide-width fiber 20 are moved to the composite material securing unit 920, the composition material securing unit 920 secures the mat 30 and the wide-width fiber 20 by applying heat and pressure thereto.

Figure 6:
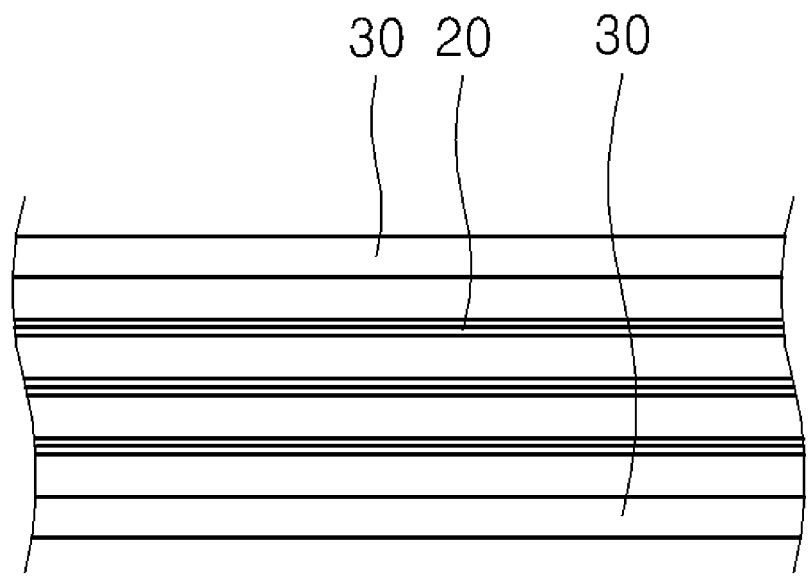
FIG. 6 is a diagram of one example of a manufactured composite material.

Therefore, the manufactured composite material may include a layer of the wide-width fiber 20 therein, as shown in FIG. 6.

Figure 7:
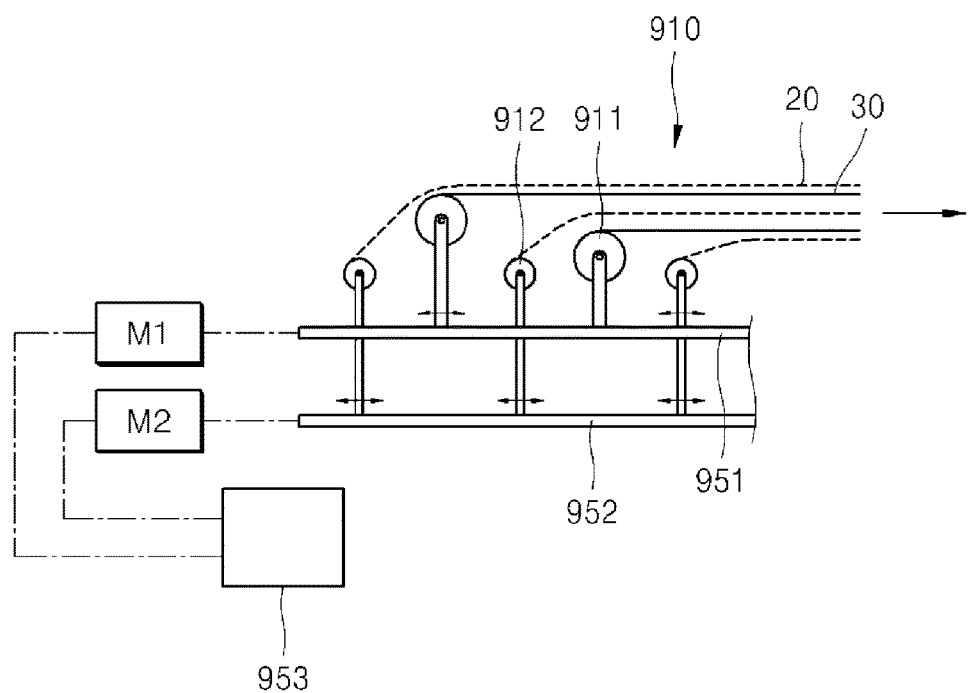
FIG. 7 is a diagram of another example of supply of a mat and wide-width fiber performed by the composite material feeder according to the embodiment of the present invention.
Figure 8:
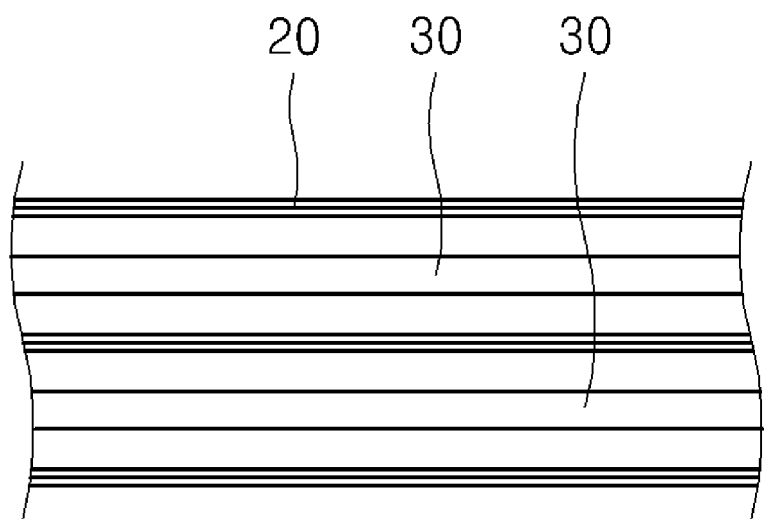
FIG. 8 is another example of a manufactured composite material.

On the other hand, when the mat feeding rollers 911 and the wide-width fiber feeding rollers 912 are disposed as shown in FIG. 7, the manufactured composite material may include the mat 30 forming a layer between the wide-width fiber 20, as shown in FIG. 8.

Thus, according to the present invention, a stacking order of the wide-width fiber layer of the composite material may be determined by changing the positions of the mat feeding rollers and the wide-width fiber feeding rollers.

That is, according to the present invention, stacking may be performed such that the wide-width fiber is formed in multiple layers and the wide-width fiber formed in multiple layers are wrapped with the mat, or such that the mat and the wide-width fiber are alternately stacked.

Accordingly, the mat may be disposed in various ways depending upon purposes of the composite material to be manufactured, thereby enabling easy manufacture of automotive exterior materials with high strength and reduced weight, such as seatbacks for automobiles, underbody covers, battery carriers, back-beams, and the like.

Heretofore, although some embodiments of according to the present invention have been described, it is obvious that various modifications can be made without departing from the spirit and scope of the invention.

Therefore, the present invention should not be limited to the foregoing embodiments, and the scope of the invention should be defined only by the accompanying claims and equivalents thereof.

That is, it should be understood that the foregoing embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the invention should be limited only by the accompanying claims and equivalents thereof.

The invention claimed is:

1. A device for manufacturing a composite material, comprising:
   a mat manufacturing unit configured to manufacture a mat in which a polymer film having a plurality of fiber layers is formed, wherein the mat manufacturing unit comprises:
      a transfer unit configured to form a transfer path, wherein the transfer unit comprises a conveyer belt, drive rollers, and a belt rotator, wherein the conveyer belt is configured to move in accordance with a rotation of the drive rollers, thereby forming the transfer path, and wherein the belt rotator is configured to rotate the drive rollers;
      a film feeder configured to supply a plurality of films to the transfer path for forming different layers;
      a fiber feeder configured to supply fibers to a space between layers of the films; and
      a sewing unit configured to sew the films and the fibers transferred along the transfer path;
   a fiber manufacturing unit configured to manufacture wide-width fiber having a unidirectional fiber layer and being formed with a plastic resin, wherein the fiber manufacturing unit comprises:
      a plurality of plastic resin feeders configured to supply the plastic resin, wherein each plastic resin feeder of the plurality of plastic resin feeders comprises a plastic resin feeding roller, and an amount of the plastic resin wound around the plastic resin feeding roller;
      a unidirectional fiber feeder configured to supply unidirectional fibers to a space between layers of the supplied plastic resin; and
      a securing unit configured to fasten the unidirectional fibers to the plastic resin by applying heat and pressure to the plastic resin; and
   a composite material manufacturing unit configured to receive the mat and the wide-width fiber and stacking the mat and the wide-width fiber in a preset stacking order, wherein the composite material manufacturing unit comprises:
      a composite material feeder configured to supply the mat and the wide-width fiber at different positions, wherein the composite material feeder comprises:
         a plurality of mat feeding rollers around which the mat is wound;
         a plurality of wide-width fiber feeding rollers around which the wide-width fiber is wound; and
         a position mover configured to receive an input of stacking order and to change positions of the plurality of mat feeding rollers and the plurality of wide-width fiber feeding rollers for forming the composite material having the stacking order, wherein the position mover comprises:
            a first guide fixed to each of the plurality of mat feeding rollers configured to guide a movement of the plurality of mat feeding rollers;
            a second guide fixed to each of the plurality of wide-width fiber feeding rollers configured to guide a movement of the plurality of wide-width fiber feeding rollers;
            a first motor configured to move each mat feeding roller of the plurality of mat feeding rollers;
            a second motor configured to move each wide-width fiber feeding roller of the plurality of wide-width fiber feeding rollers; and
            a controller configured to receive the input of stacking order and to control each of the mat feeding rollers and each of the wide-width fiber feeding rollers to move to preset positions for forming the stacking order by driving the first and second motors,
         wherein the first motor is connected to the first guide member, and the second motor is connected to the second guide member;
      a press configured to fasten the mat and the wide-width fiber supplied by being wound on the plurality of mat feeding rollers and wide-width fiber feeding rollers by applying heat and pressure to the mat and the wide-width fiber, thereby forming the composite material;
      a cooler configured to cool the composite material; and
      a winder configured to wind the cooled composite material,
   wherein a stacking order of the mat and the wide-width fiber is determined by the different positions at which the mat and the wide-width fiber are supplied.

2. The device according to claim 1, wherein the unidirectional fiber feeder comprises:
   a unidirectional fiber feeding roller around which the unidirectional fiber is wound;
   a plurality of guide rollers disposed at crossing positions so as to guide the unidirectional fibers unwound from the unidirectional fiber feeding roller to the securing unit; and
   a plurality of elevators receiving power and adjusting a width of the unidirectional fibers by moving the plural guide rollers up and down.

3. The device according to claim 2, wherein
   the unidirectional fiber feeder further comprises an air feeder, the air feeder supplying air of a certain pressure to an outer surface of the unidirectional fibers during movement of the unidirectional fibers.

4. The device according to claim 1, wherein the film feeder comprises:
   a plurality of film feeding rollers each comprising the film wound therearound and disposed at regular intervals along the transfer path at an upper side of the transfer path; and
   a first rotator rotating the plural film feeding rollers such that each of the films is unwound.

5. The device according to claim 4, wherein the fiber feeder comprises:
   a plurality of fiber feeding rollers supplying the fibers;
   a second rotator rotating the fiber feeding rollers such that the fibers are unwound; and a plurality of cutters disposed between the film feeding rollers and cutting each of the unwound fibers to a certain length.

\* \* \* \* \*